(12) United States Patent
Thrimawithana

(10) Patent No.: US 12,333,747 B2
(45) Date of Patent: *Jun. 17, 2025

(54) SYSTEM AND METHOD FOR DIMENSIONING TARGET OBJECTS

(71) Applicant: ZEBRA TECHNOLOGIES CORPORATION, Lincolnshire, IL (US)

(72) Inventor: Raveen T. Thrimawithana, Pannipitiya (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,888

(22) Filed: Dec. 5, 2023

(65) Prior Publication Data

US 2024/0104755 A1     Mar. 28, 2024

Related U.S. Application Data

(63) Continuation of application No. 17/384,212, filed on Jul. 23, 2021, now Pat. No. 11,836,937.

(51) Int. Cl.
| | |
|---|---|
| *G06T 7/521* | (2017.01) |
| *G05D 1/00* | (2006.01) |
| *G05D 1/02* | (2020.01) |
| *G06F 18/2433* | (2023.01) |

(52) U.S. Cl.
CPC ........... *G06T 7/521* (2017.01); *G05D 1/0236* (2013.01); *G05D 1/0251* (2013.01); *G05D 1/027* (2013.01); *G06F 18/2433* (2023.01); *G06T 2207/10028* (2013.01)

(58) Field of Classification Search
CPC ........... G06T 7/521; G06T 2207/10028; G06F 18/2433; G05D 1/0236; G05D 1/0251; G05D 1/027

See application file for complete search history.

(56) References Cited

U.S. PATENT DOCUMENTS

| | | | | |
|---|---|---|---|---|
| 10,403,037 | B1 * | 9/2019 | Boardman | G06V 10/17 |
| 10,459,084 | B2 * | 10/2019 | Chen | G01S 17/88 |
| 10,962,355 | B2 * | 3/2021 | Chang | G01S 17/89 |
| 11,398,081 | B2 * | 7/2022 | Molyneaux | G06V 20/10 |
| 11,614,742 | B2 * | 3/2023 | Wang | G06T 7/521 |
| | | | | 701/23 |
| 11,823,394 | B2 * | 11/2023 | Hayashi | G06T 7/248 |

\* cited by examiner

*Primary Examiner* — Gregory M Desire

(57) ABSTRACT

A method comprising obtaining, from a sensor, depth data representing a target object; selecting a model to fit to the depth data; for each data point in the depth data: defining a ray from a location of the sensor to the data point; and determining an error based on a distance from the data point to the model along the ray; when the depth data does not meet a similarity threshold for the model based on the determined errors, selecting a new model and repeating the error determination for the depth data based on the new model; when the depth data meets the similarity threshold for the model, selecting the model as representing the target object; and outputting the selected model representing the target object.

11 Claims, 6 Drawing Sheets

SYSTEM AND METHOD FOR DIMENSIONING TARGET OBJECTS

RELATED APPLICATION

This U.S. patent arises from a divisional of U.S. application Ser. No. 17/384,212, filed Jul. 23, 2021, which is hereby incorporated herein by reference.

BACKGROUND

Sample consensus model fitting can be used to determine models for target objects. Such model fitting methods often use a fixed error bound to classify data points as inliers or outliers for the model. However, these methods may not account for inaccuracies of the sensors used to obtain the data, particularly near the edges of the field of view of the sensors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
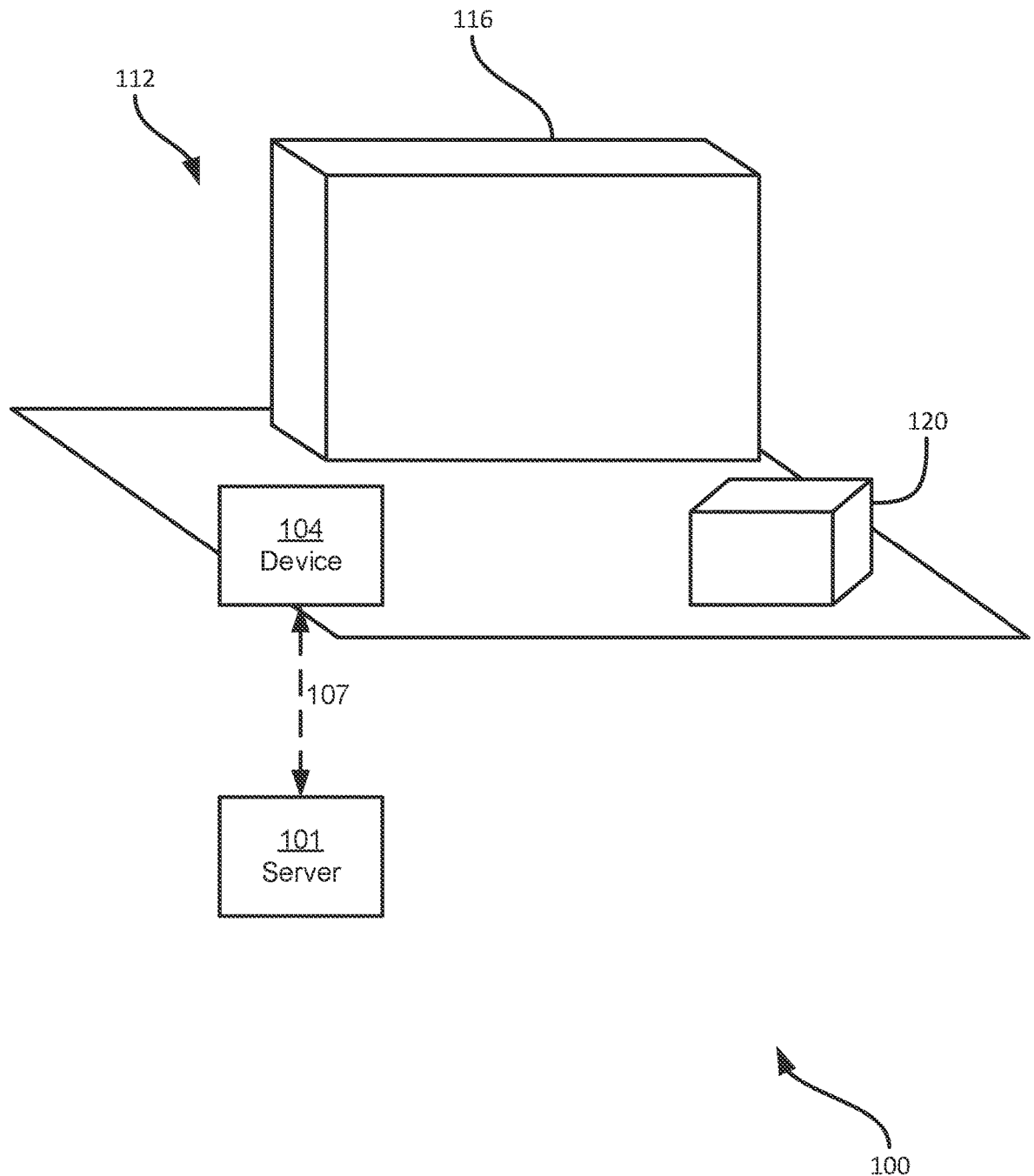
FIG. 1 is a schematic diagram of a system for dimensioning a target object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dimensioning a target object comprising: controlling a depth sensor to determine depth data representing the target object; selecting an object model based on the depth data; for each data point in the depth data: defining a ray from a location of the sensor to the data point; and determining an error based on a distance from the data point to an intersection of the ray with the object model; accumulating one or more determined errors; when the depth data meets a similarity threshold for the object model, selecting the object model as representing the target object; and determining an object dimension based on the selected object model.

Additional examples disclosed herein are directed to a device comprising: a depth sensor configured to obtain depth data representing a target object; a memory; a processor interconnected with the depth sensor and the memory, the processor configured to: control the depth sensor to determine depth data representing the target object; select an object model based on the depth data; for each data point in the depth data: define a ray from a location of the sensor to the data point; and determine an error based on a distance from the data point to an intersection of the ray with the object model; accumulate one or more determined errors; when the depth data meets a similarity threshold for the object model, select the object model as representing the target object; and determine an object dimension based on the selected object model.

FIG. 1 depicts a system 100 for dimensioning a target object in accordance with the teachings of this disclosure. The system 100 includes a server 101 in communication with a computing device 104 (also referred to herein as the detection device 104 or simply the device 104) via a communication link 107, illustrated in the present e ample as including wireless links. For example, the link 107 may be provided by a wireless local area network (WLAN) deployed by one or more access points (not shown). In other examples, the server 101 is located remotely from the device 104 and the link 107 may therefore include one or more wide-area networks such as the Internet, mobile networks, and the like.

The system 100, and more particularly, the device 104, is deployed to dimension one or more objects, such as a space 112, including the walls and floor of the space, structural features within the space 112, such as a shelf 116, or objects within the space, such as a box 120. The device 104 may be a navigational device, or a component of a navigational device to allow a mobile automation system to traverse the space 112. For example, the mobile automation system may be to traverse aisles of a retail facility to update prices, check stock, and the like. Accordingly, the device 104 may detect and model the shelf 116 or other aisle features, as well as the walls and floor of the space 112 to allow for navigation in the space 112. Further, the device 104 may detect and model obstacles, such as the box 120 to allow the mobile automation system to navigate around such obstacles. In other examples, the device 104 may be a dimensioning device, or a component of a dimensioning device to determine the size and shape of an obstacle such as the box 120. For example, the device 104 may be deployed in a transport and logistics facility to determine the dimensions of packages prior to shipping. As will be appreciated, the device 104 may be deployed in other use cases to accurately detect and model target objects.

In order to detect and model the target objects, the device 104 may employ a random sample consensus (RANSAC) method, or other suitable sample consensus fitting method to model the target object using relevant data points, while disregarding outlying data points such that they have no impact on the selection of the final model. Traditionally, such methods select an object model, and use the orthogonal distance from each data point to the model to determine the error for the given data point. However, depth sensors may generally have higher accuracy near the center of their field of views, while having lower accuracy at the edges or fringes of their fields of view. Accordingly, such error determinations may include data points which should be excluded near the outer reaches of the field of view of the depth sensor.

Accordingly, as will be described in further detail below, the device 104 determines the error for each data point along a ray defined from the location of the sensor to the data point. Error determination using the same threshold values will thus be stricter near the edges of the field of view of the depth sensor to correspond to the decreasing accuracy of the depth sensor in those regions.

Figure 2:
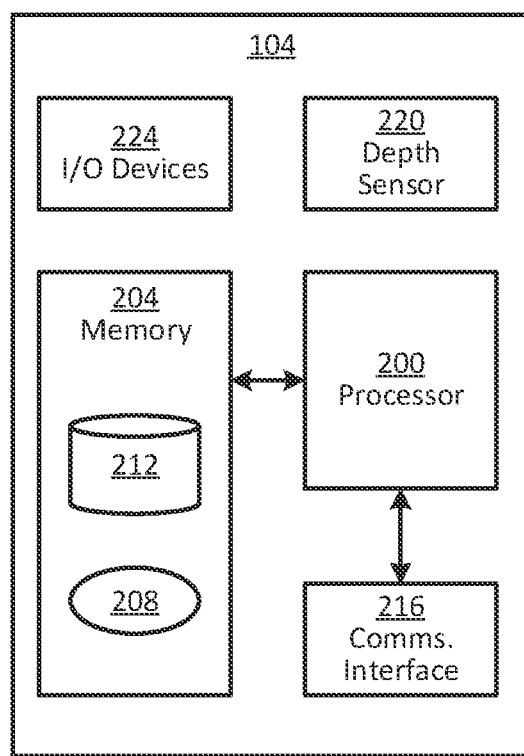
FIG. 2 is a block diagram of certain internal hardware components of the detection device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores a dimensioning application 208 which, when executed by the processor, configures the processor 200 to perform various functions discussed below in greater detail and related to the target dimensioning operation of the device 104. The application 208 may also be implemented as a suite of distinct applications.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the dimensioning operations discussed herein.

The memory 204 also stores a repository 212 storing rules and data for the target dimensioning operation. For example, the repository 212 may store error thresholds, inlier percentage thresholds, and other relevant data for the target dimensioning operation.

The device 104 also includes a communications interface 216 enabling the device 104 to exchange data with other computing devices such as the server 101. The communications interface 216 is interconnected with the processor 200 and includes suitable hardware (e.g. transmitters, receivers, network interface controllers and the like) allowing the device 104 to communicate with other computing devices—such as the server 101—via the link 107. The specific components of the communications interface 216 are selected based on the type of network or other links that the device 104 is to communicate over. The device 104 can be configured, for example, to communicate with the server 101 via the link 107 using the communications interface to send data to the server 101.

The device 104 further includes a depth sensor 220 interconnected with the processor 200. The processor 200 is enabled to control the depth sensor 220 to capture data representing a target, such as the space 112, the shelf 116, or the box 120. For example, the depth sensor 220 may be a 3D digital camera capable of capturing depth data, one or more LIDAR sensors, a stereoscopic imaging system, or the like.

The device 104 may further include one or more input and/or output devices 224. The input devices 224 may include one or more buttons, keypads, touch-sensitive display screens or the like for receiving input from an operator. The output devices 224 may further include one or more display screens, sound generators, vibrators, or the like for providing output or feedback to an operator.

In some examples, the device 104 may further include additional modules (not shown), to use the selected object model of the target object for further operations. For example, the device 104 may include a navigational module configured to determine a path for a mobile automation system to navigate in view of the selected object model. Alternately or additionally, the device 104 may include a dimensioning module configured to further dimension the target object based on the selected object model.

Figure 3:
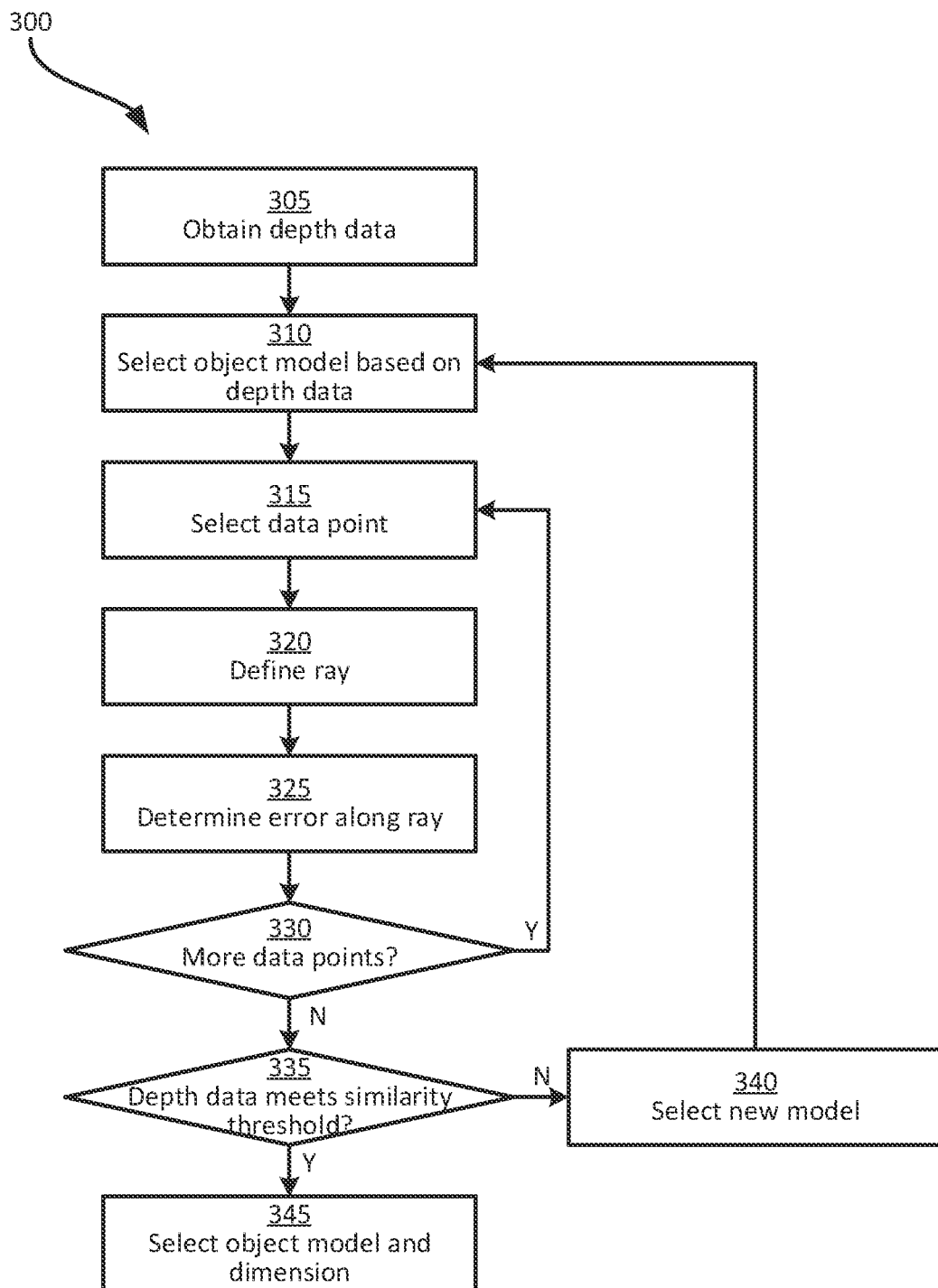
FIG. 3 is a flowchart of a method of dimensioning a target object.

Turning now to FIG. 3, the functionality implemented by the device 104 will be discussed in greater detail. FIG. 3 illustrates a method 300 of dimensioning a target object. The method 300 will be discussed in conjunction with its performance in the system 100, and particularly by the device 104, via execution of the application 208. In particular, the method 300 will be described with reference to the components of FIGS. 1 and 2. In other examples, the method 300 may be performed by other suitable devices or systems, such as the server 101.

The method 300 is initiated at block 305, where the sensor 220 obtains depth data representing a scene including a target object to be dimensioned. For example, the target object may be the walls and/or floor of the space 112, the surfaces of the shelf 116, or the box 120. The depth data may be a point cloud—i.e., a collection of data points each representing a distance or depth of the data point from the sensor 220. The depth data may include relevant data points for detecting and modelling the target object, as well as additional data points representing the surrounding environment of the target object, which do not contribute to the modelling of the target object.

At block 310, the processor 200 selects an object model to fit to the depth data obtained at block 310. That is, the processor 200 selects an object model to roughly match the data points to the object model. The object model may be, for example, a line, a plane a rectangular prism, or other geometric shape which fits the overall shape of the point cloud. In other examples, rather than selecting the object model based on all the data points in the depth data, the processor 200 may first select a subset of the depth data and select an object model based on the subset.

After selecting an object model, the processor 200 may determine an overall similarity of the object model to the depth data to determine whether the selected object model sufficiently represents the depth data. In particular, to determine the overall similarity, the processor 200 may first determine an error of each data point relative to the object model.

Accordingly, at block 315, the processor 200 selects a data point from the depth data. In particular, the processor 200 selects a data point for which an error has not yet been computed.

At block 320, the processor 200 defines a ray from a location of the sensor 220 to the selected data point. That is, the processor 200 may retrieve the location of the sensor 220 from the memory 204 based on a known spatial relationship between the detected data points and the sensor 220. The ray may then be defined from the retrieved location and the selected data point.

In some examples, the depth data may be obtained from more than one sensor 220. For example, the device 104 itself may include more than one sensor 220, or the depth data may be an accumulation of data points from a plurality of different devices 104, such as in a simultaneous localization and mapping (SLAM) implementation. In such examples, prior to defining the ray, the processor 200 may first identify the source sensor for the selected data point. The processor 200 may then define the ray from the location of the source sensor to the data point.

At block 325, the processor 200 determines an error for the data point based on the distance, along the ray defined at block 320, from the data point to the object model. That is, the processor 200 may first determine a point of intersection between the ray and the object model. The processor 200 then computes the distance between this point of intersection and the data point, for example based on the Euclidean distance between the two points. This distance may be defined as the error for the data point. The processor 200 may store the determined error in the repository 212 for further processing.

Figure 4:
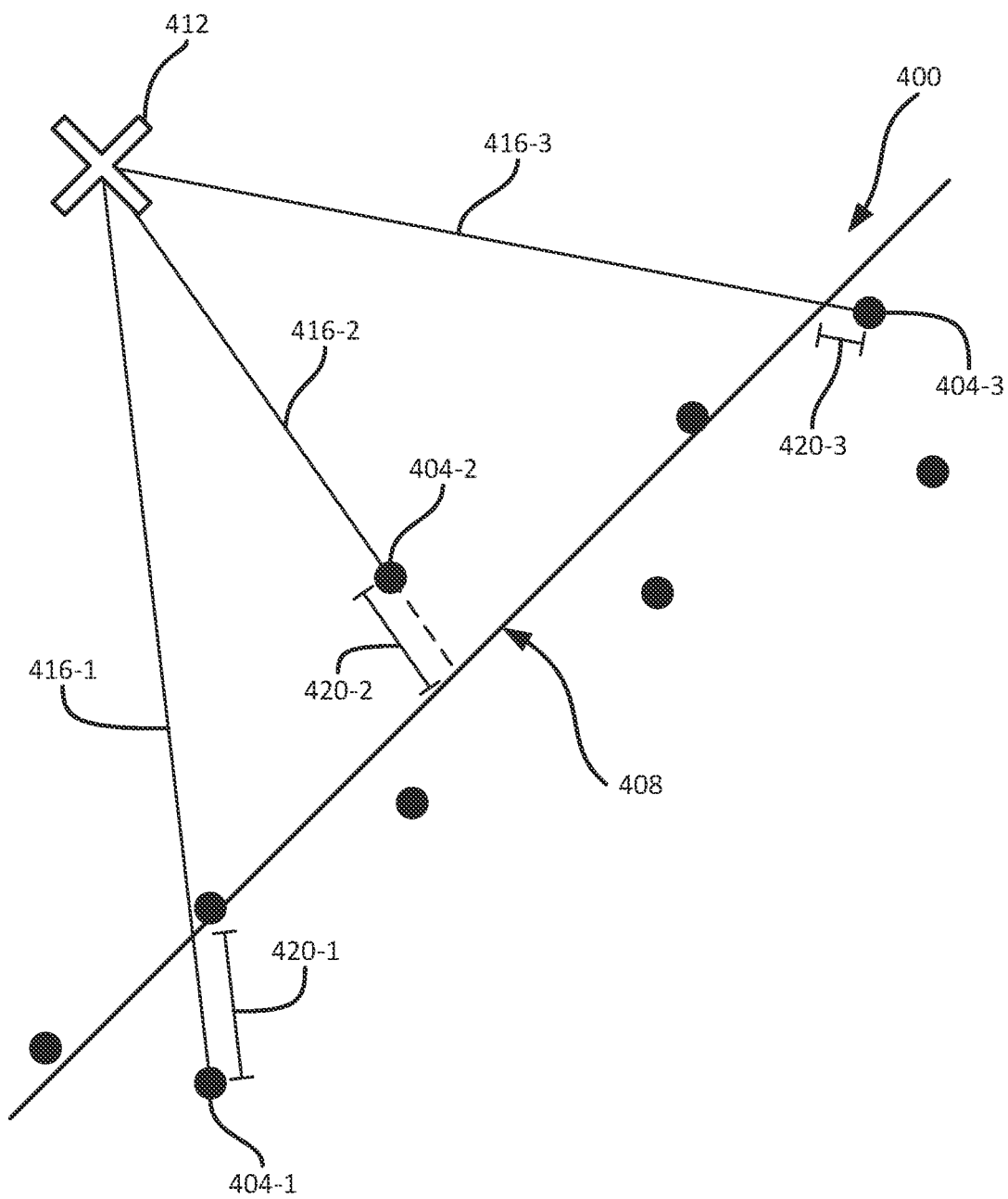
FIG. 4 is a schematic diagram of an example performance of the ray definition and error determination at blocks 320 and 325 of the method of FIG. 3.

For example, FIG. 4 shows example depth data 400 captured by the sensor 220. The depth data 400 includes data points 404, of which three example data points 404-1, 404-2, and 404-3 (referred to generically as a data point 404 and collectively as data points 404—this nomenclature is also used elsewhere herein) are particularly noted. The processor 200 fits an object model 408 to the depth data 400. In the present example, the object model 408 is a line. For example, the depth data 400 and the object model 408 may represent an edge of an object or a surface. As will be appreciated, in other examples, other object models, such as a plane representing a floor, wall or other surface, a rectangular prism representing a box, or other geometric objects are contemplated.

The processor 200 may determine that the sensor 220 is located at a location 412 based on the known configuration of the sensor 220 and the detected depth data 400 relative to the sensor 220. Accordingly, at block 320, the processor 200 defines a ray 416 from the location 412 to a selected data point. Three rays 416-1, 416-2, and 416-3 are depicted in the present example, corresponding to data points 404-1, 404-2, and 404-3, respectively. The processor 200 may then determine a distance between the data points 404 and the respective points of intersection of the rays 416 and the object model 408. These distances represent, respectively, the errors 420-1, 420-2, and 420-3 for the data points 404-1, 404-2, and 404-3.

In some examples, in addition to determining the error for the selected data point at block 325, the processor 200 may additionally classify the data point as an inlier or an outlier for the object model selected at block 310. For example, the data point may be classified as an inlier or an outlier based on the determined error for the data point. The processor 200 may compare the error for the data point to an error threshold (e.g., retrieved from the memory 204). If the error is above the error threshold, the processor 200 classifies the data point as an outlier. If the error is below the error threshold, the processor 200 classifies the data point as an inlier.

Figure 5:
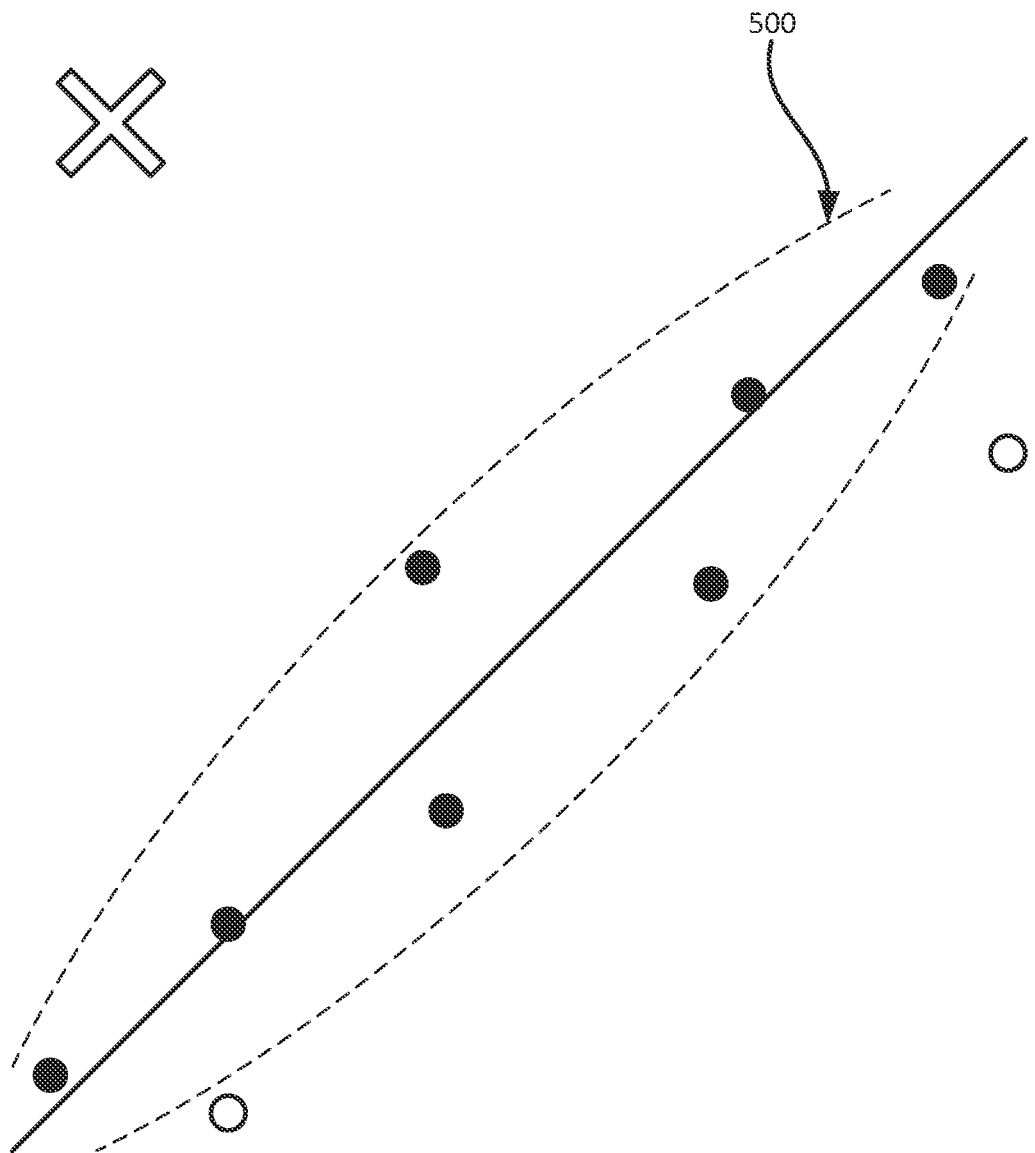
FIG. 5 is a schematic diagram of an example inlier envelope defined based on the error determination at block 325 of the method of FIG. 3.

Since the error is defined along the ray from the location of the sensor 220 to the data point, the envelope of inliers is narrow near the edges of the field of view of the sensor 220 and wider towards the center of the field of view of the sensor 220. For example, referring to FIG. 5, a schematic diagram of an envelope 500 representing the error threshold is depicted. Data points within the envelope 500 (represented as solid circles) are classified as inliers, while data points outside the envelope 500 (represented as circle outlines) are classified as outliers.

Thus, a data point having a given orthogonal distance from the object model which is near the center of the field of view of the sensor 220 may be classified as an inlier, while a data point having the same orthogonal distance from the object model but which is closer to the edge of the field of view of the sensor 220 may be classified as an outlier. That is, the ray-traced error provides for a higher orthogonal distance error threshold near the center of the field of view of the sensor 220 and a lower orthogonal distance error threshold near the edges of the field of view of the sensor 220. This is in line with the accuracy of the depth measurements detected by the sensor 220; generally, the sensor 220 has a higher accuracy closer to the center of its field of view, and a lower accuracy closer to the edges of its field of view.

In other examples, rather than having a predefined error threshold used to classify the data points, the error threshold may be dynamically selected based on the distance of the data point from the sensor 220. For example, the processor 200 may select a higher error threshold for data points which are further from the sensor 220. Thus, the memory 204 may store an association between a range of distances for data points, and a corresponding error threshold to be used for data points within that range. Prior to classifying the data point as an inlier or an outlier, the processor 200 therefore retrieves the error threshold based on the distance of the data point from the sensor 220. The processor 200 then compares the error of the data point to the retrieved error threshold to classify the data point as an inlier or an outlier.

Figure 6:
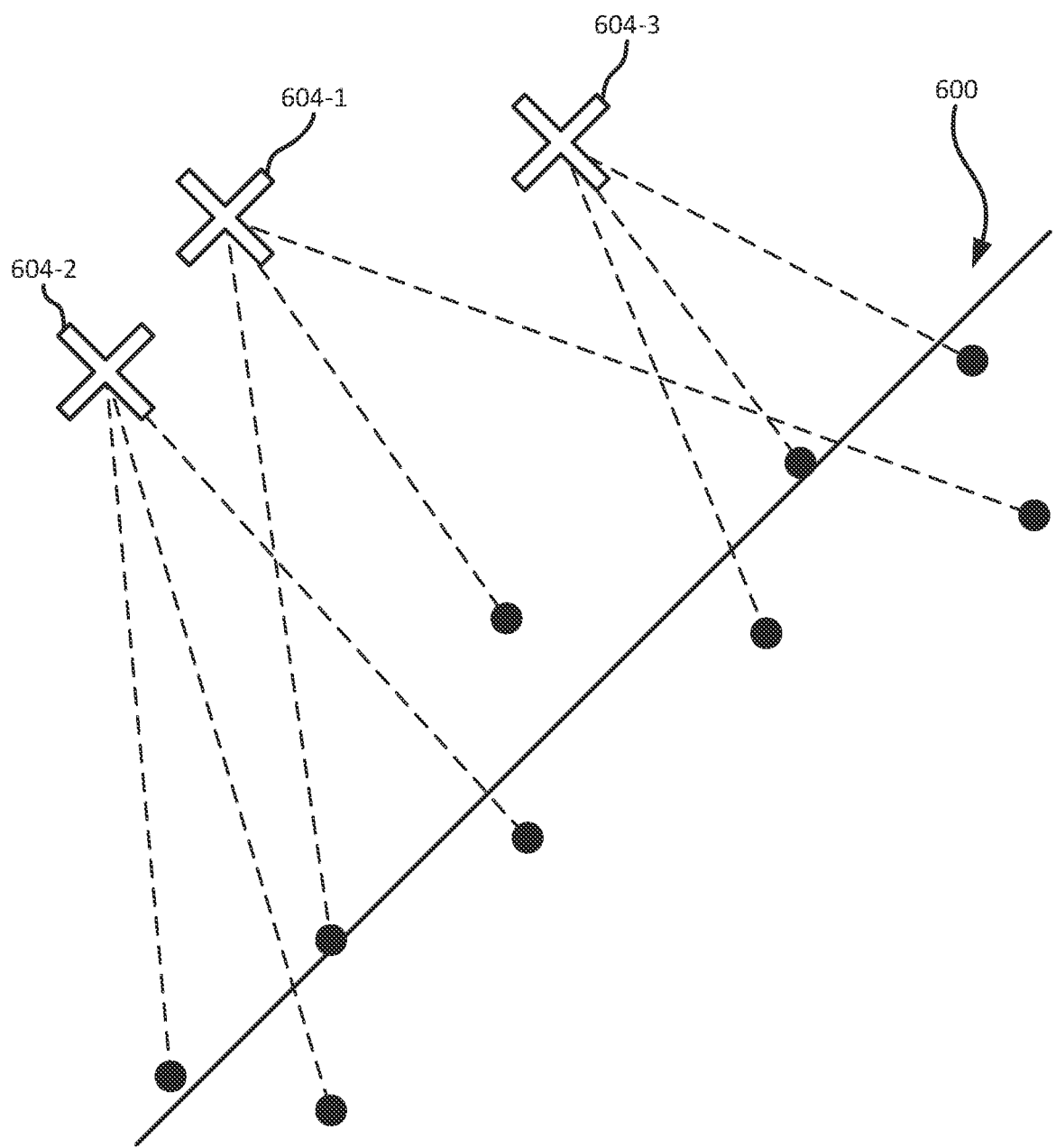
FIG. 6 is a schematic diagram of another example performance of the ray definition and error determination at blocks 320 and 325 of the method of FIG. 3.

Referring to FIG. 6, example depth data 600 captured by a plurality of sensors is depicted. The sensors are located at locations 604-1, 604-2, and 604-3. As can be seen, for a given data point, the processor 200 defines a ray from the location of the respective source sensor 604 of the data point to the data point. The errors for each data point are then computed along these rays. Thus, each of the sensors may have its own error threshold and envelop with which to classify the data points.

Returning to FIG. 3, after determining the error for the data point, at block 330, the processor 200 determines whether there are additional data points in the depth data or subset of depth data for which the error is to be determined. If the determination is affirmative, the processor 200 returns to block 315 to select the next data point and determine its error.

If the determination at block 330 is negative, the processor 200 proceeds to block 335. At block 335, the processor 200 determines whether the depth data and the object model selected at block 310 meet a similarity threshold based on the errors determined for the data points. That is, the processor 200 determines whether the selected object model sufficiently represents the depth data.

To determine whether the depth data and the object model meet a similarity threshold, the processor 200 may use the classification of the data points as inliers and outliers. In particular, if at least a threshold percentage of the data points in the depth data are inliers, the processor 200 may make an affirmative determination at block 335. If less than the threshold percentage of data points in the depth data are inliers, the processor 200 makes a negative determination at block 335. In other examples, other similarity thresholds may be used. For example, rather than using the classification of the data points as inliers or outliers, the processor 200 may use the error values themselves to determine whether the depth data and the object model meet a similarity threshold.

If the determination at block 335 is negative, the processor 200 proceeds to block 340. At block 340, selects a new object model for the depth data and returns to block 310 to fit the new object model to the depth data and repeat the error determination for the depth data based on the new object model. In particular, the new object model may be selected based on a subset of the depth data. The subset may be a randomly selected subset, or may be the set of data points classified as inliers.

If, at block 335, the processor 200 determines that the depth data meets the similarity threshold for the object model, the processor 200 proceeds to block 345. At block 345, the processor 200 selects the object model as representing the target object. The selected object model representing the target object is then used to determine an object dimension of the target object. In addition, the object model may be used for further outputs. For example, the processor 200 may display the object model representing the target object at a display of the device 104.

In other examples, the object model may be transmitted to other operational modules for further processing and/or for other operations. For example, the object model may be sent to a navigational module to allow a mobile automation system to map the target object and navigate around or through the target object accordingly. Alternately, the model may be sent to a dimensioning module to allow a dimensioning device to accurately dimension the target object.

Additionally, the method 300 may include other stop conditions, such as a number of iterations attempted. If a threshold number of iterations of selections of new models have been attempted, the processor 200 may terminate the method 300 and output an error notification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
obtaining depth data representing a target object;
selecting an object model as representing the target object based at least in part on the depth data meeting a threshold associated with the object model;
selecting at least one data point from the depth data;
defining a ray based at least in part on the at least one data point and a first location;
determining an error based at least in part on a distance from the at least one data point to an intersection of the selected object model and the ray.

2. The method of claim 1, wherein the first location is the location of a sensor.

3. The method of claim 1, wherein the threshold is a matching or similarity threshold.

4. The method of claim 1, further comprising:
determining an object dimension based at least in part on the selected object model.

5. The method of claim 1, further comprising classifying each data point as an inlier or an outlier based on an error threshold and the error for the data point.

6. The method of claim 5, further comprising selecting the error threshold for the data point based on a distance of the data point from the first location.

7. The method of claim 5, wherein the depth data is determined to meet the error threshold when a threshold percentage of the depth data are classified as inliers.

8. The method of claim 5, wherein a second object model is selected based at least in part on a subset of the depth data classified as inliers.

9. The method of claim 1, further comprising:
obtaining further depth data associated with the target object;
selecting at least one further data point from the further depth data;
determining a source sensor for each further data point; and
wherein one or more further rays are defined from the location of an associated source sensor for each further data point.

10. The method of claim 1, further comprising one or more of:
displaying the selected model; and
using the selected model for navigational purposes.

11. The method of claim 1, further comprising, when the depth data does not meet the threshold for the object model based on an accumulated one or more determined errors, selecting a new object model and repeating the error determination for each data point in the depth data based on the new object model.

* * * * *